Aug. 27, 1935.  J. W. BOWERSOX  2,012,904
MECHANISM FOR ASSEMBLING COIL SPRINGS
Filed April 26, 1934   5 Sheets-Sheet 1
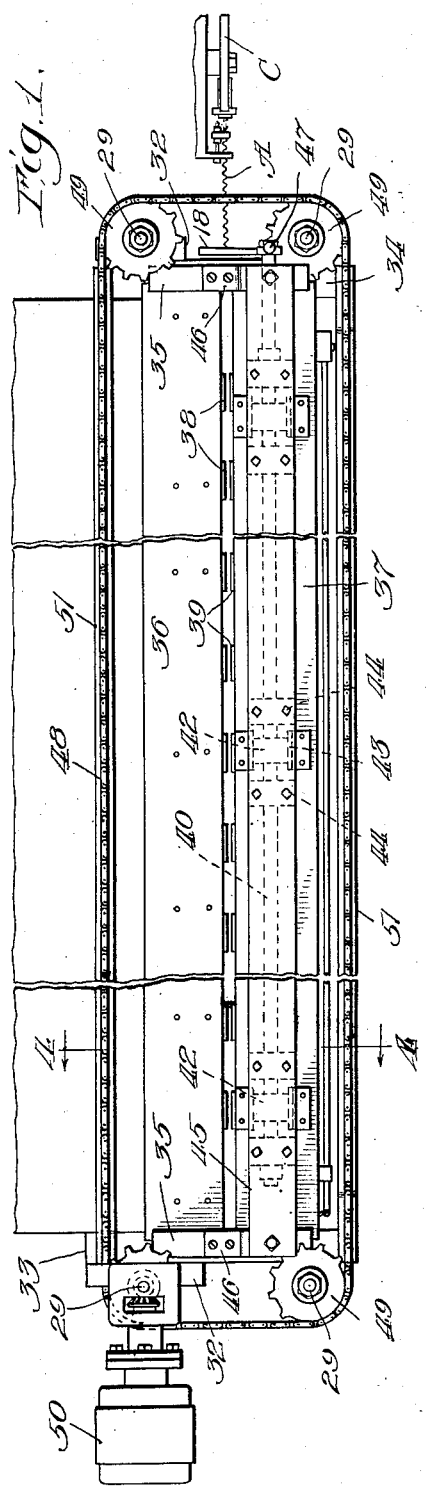
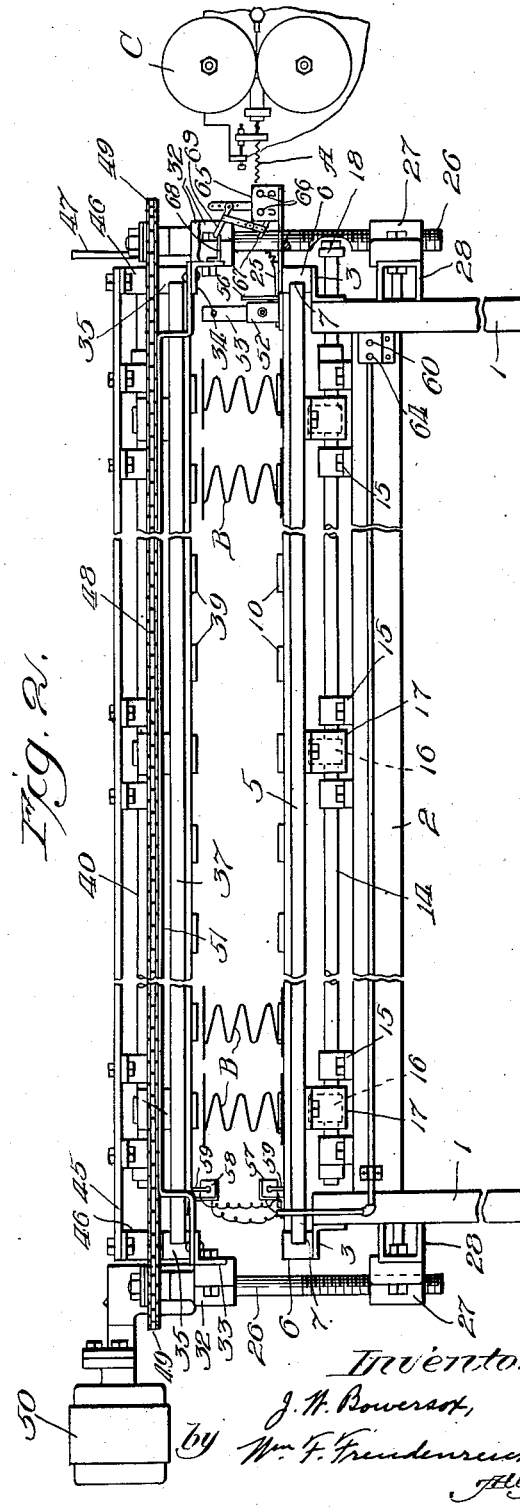
Inventor:
J. W. Bowersox,
by Wm. F. Freudenreich,
Atty

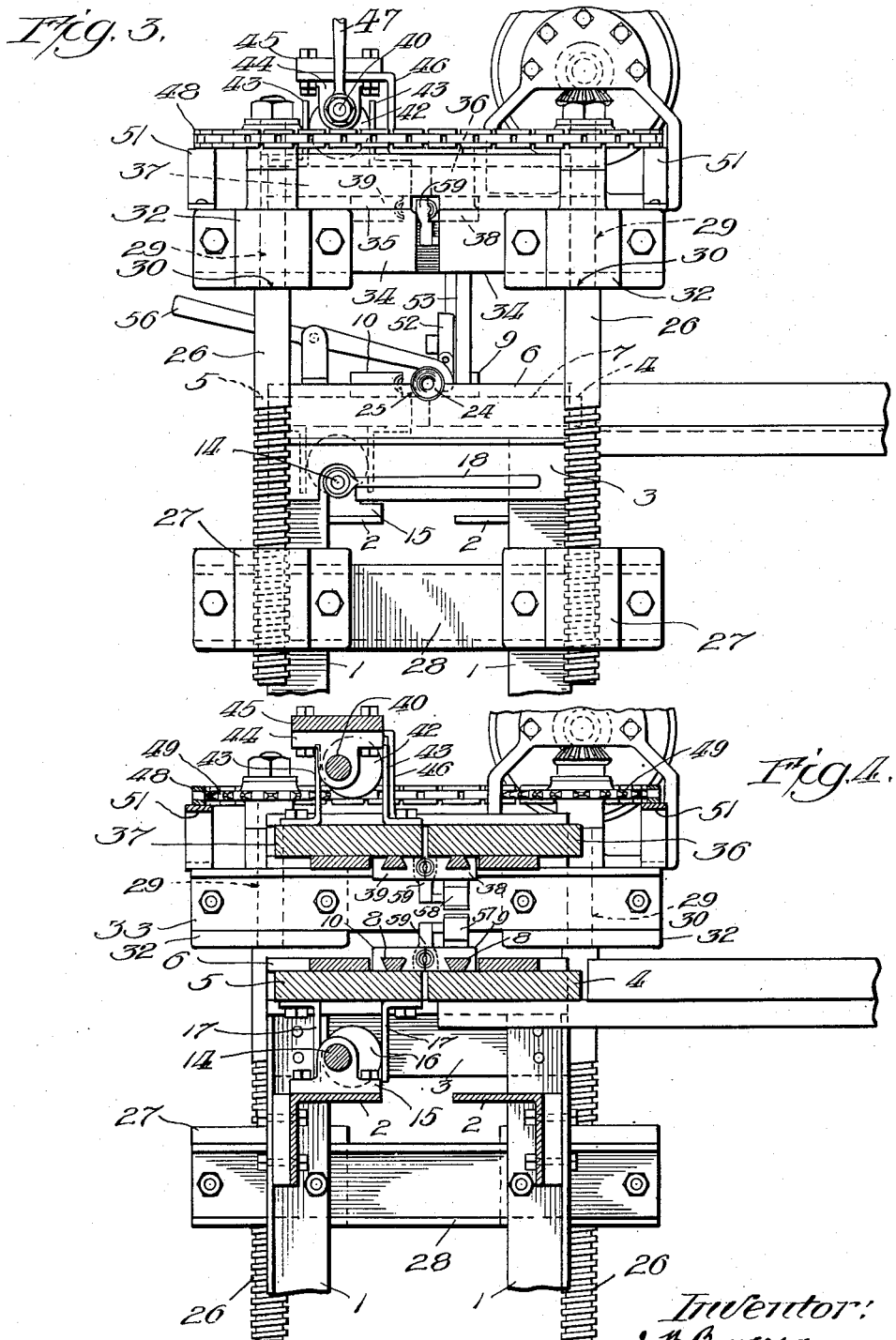

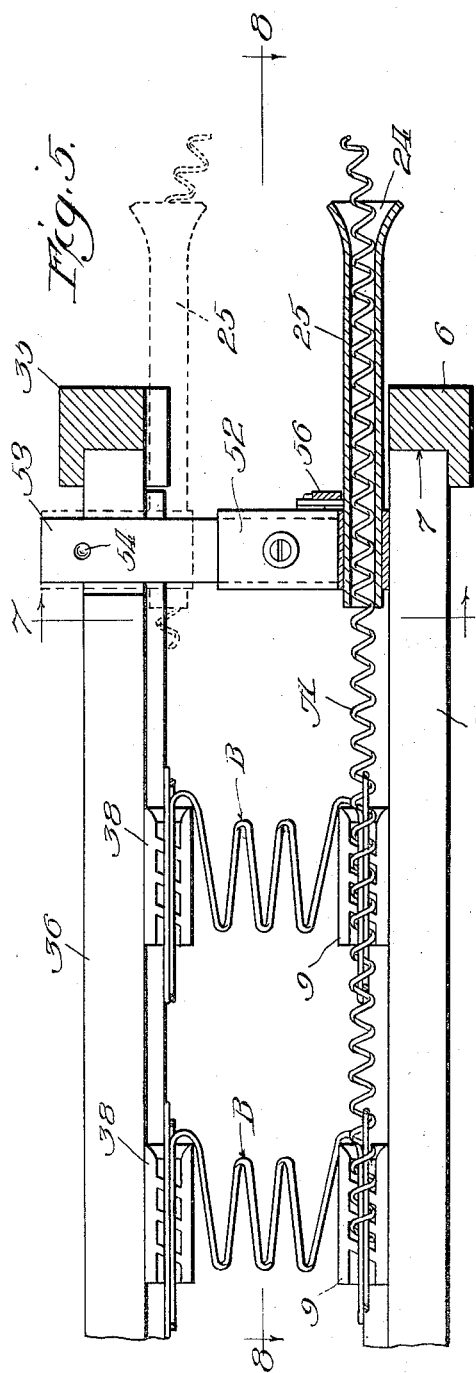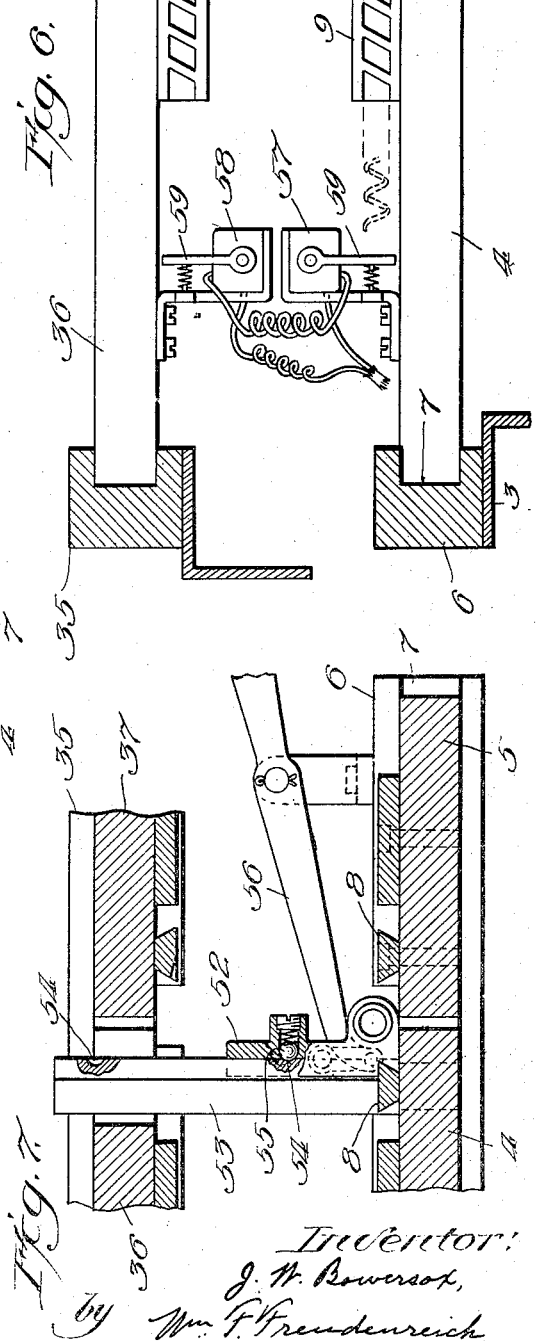

Aug. 27, 1935.   J. W. BOWERSOX   2,012,904
MECHANISM FOR ASSEMBLING COIL SPRINGS
Filed April 26, 1934    5 Sheets-Sheet 4

Inventor:
J. W. Bowersox,
by Wm. F. Freudenreich
Atty.

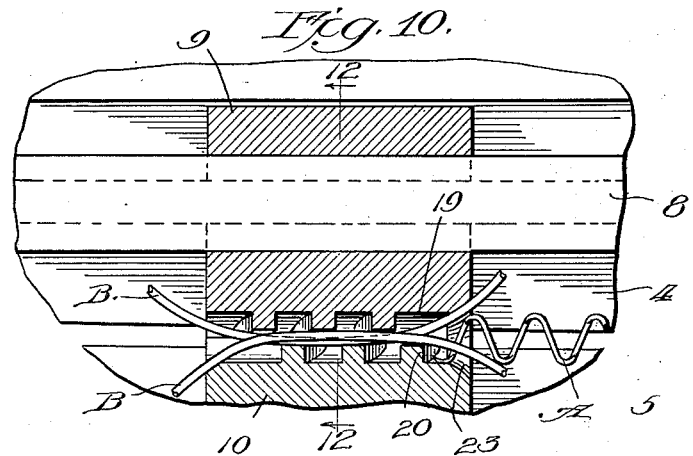
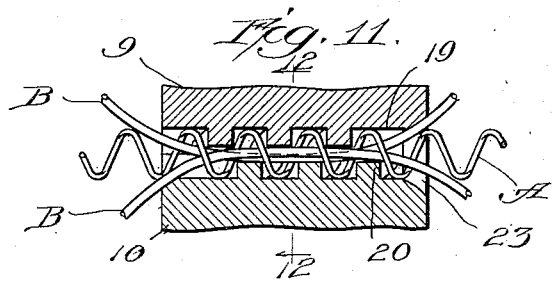
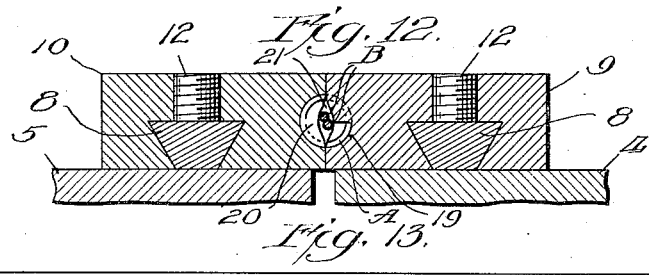
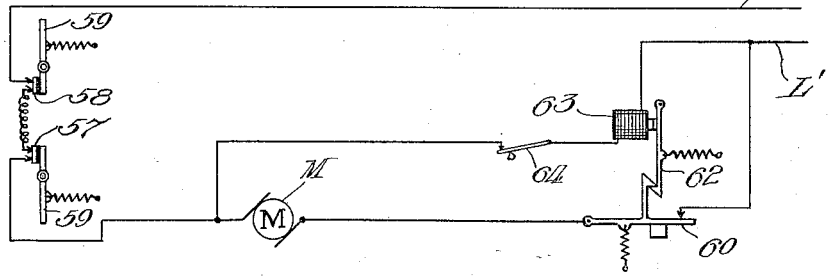

Patented Aug. 27, 1935

2,012,904

UNITED STATES PATENT OFFICE 2,012,904

MECHANISM FOR ASSEMBLING COIL SPRINGS

Joseph W. Bowersox, Chicago, Ill., assignor to Superior Felt and Bedding Co., a corporation of Illinois Application April 26, 1934, Serial No. 722,461

10 Claims. (Cl. 140—3)

Mattresses are now commonly made with spring cores composed of numerous light vertical coil springs tied together. A simple and comparatively inexpensive way of securing the vertical springs together is to screw long helical wires of small diameter lengthwise of contacting rows of vertical springs; these wires embracing meeting portions of the coils of corresponding springs, both at the top and at the bottom. In order to keep the cost of a spring core down it is necessary that the amount of labor involved in assembling the vertical springs and the helical tie members be kept low.

The object of the present invention is to produce means for automatically assembling a long helical tie wire and all of the springs in a row composed of pairs of adjacent springs spaced apart from each other lengthwise of the row.

Obviously, the oftener that an element going into a structure must be handled, the greater will be the labor cost of bringing it finally into the assembly. Viewed in one of its aspects, the present invention may be said to have for its object to eliminate the necessity of handling the tie wires after they are inserted in the machine for transforming them into long helicals until the completed helicals have been assembled in the spring structure.

In carrying out my invention I provide means for readily locating two rows of springs in contact with each other so as to form, as it were, a row or pairs of springs; clamping the parts of the corresponding coils that are to be embraced by the helical tie members in such a manner that they will be firmly held in position until the tie members are applied; and then automatically screwing the tie members, as they emerge from the forming machine, down the middle of the double row and around the sections of the coils that are held clamped together.

Figure 8:
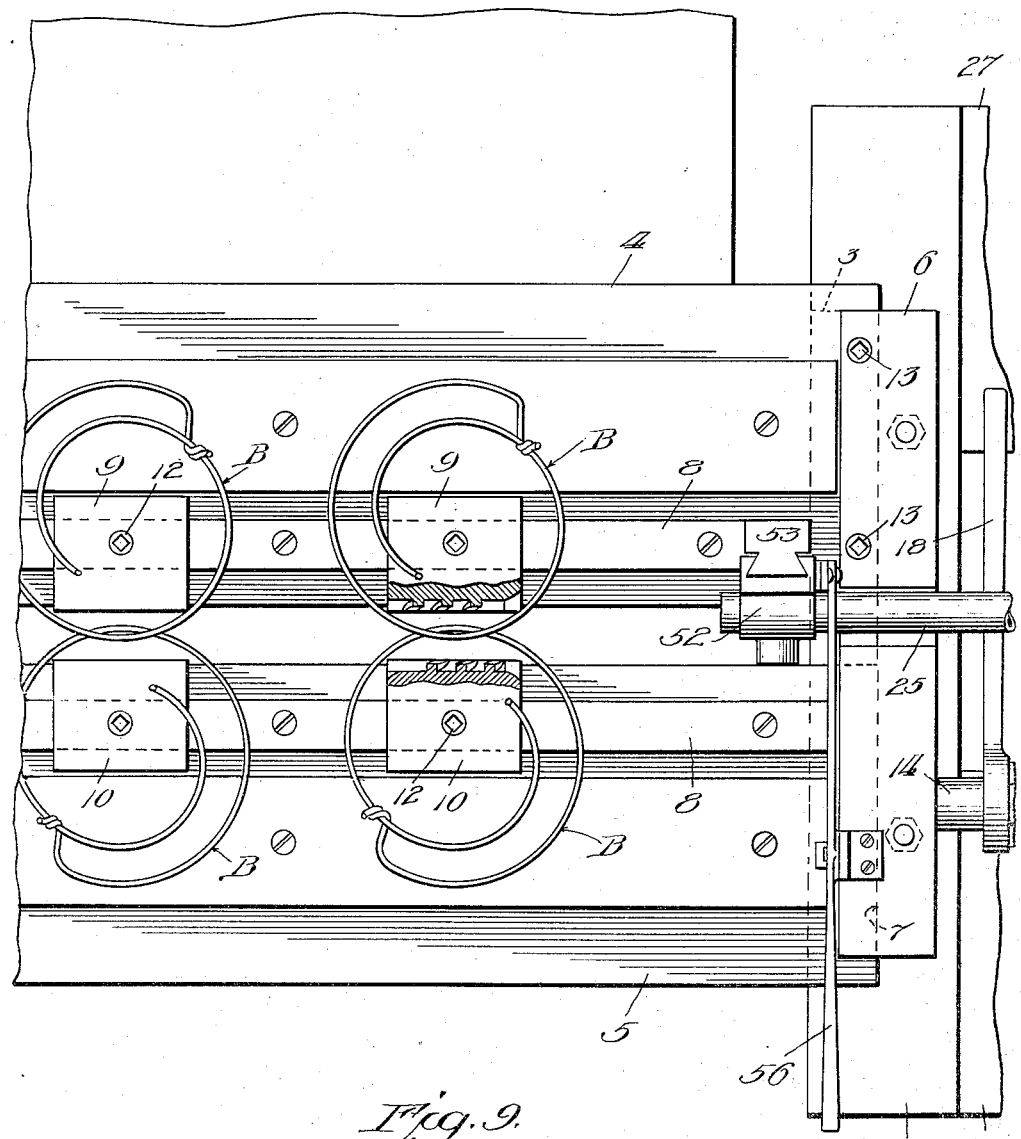
Figure 9:
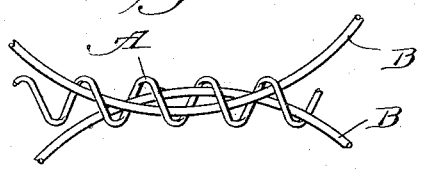

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a machine or mechanism embodying the present invention, a fragment of the mechanism for forming the helical tie wire being shown; Fig. 2 is a side view of the machine; Fig. 3 is an end view, on a larger scale, showing that end which is at the right hand in Fig. 2, namely, the front end; Fig. 4 is a vertical transverse section, on the same scale as Fig. 3, taken approximately on line 4—4 of Fig.1; Fig. 5 is a central vertical longitudinal section, on a still larger scale, through the front end of the machine; Fig. 6 is a view similar to Fig. 5, showing the rear end of the machine; Fig. 7 is a section taken on line 7—7 of Fig. 5; Fig. 8 is a section taken on line 8—8 of Fig. 5, showing the dies open and the helical tie member having not yet been fed in; Fig. 9 is a fragment of the spring cushion showing the tie between two of the coils; Fig. 10 is a horizontal section through a pair of the springs and dies or tie-guiding clamps closed on the wires of two coils, the tie wire being shown as just entering the dies; Fig. 11 is a view similar to Fig. 10, showing the helical tie extending entirely through the dies, a smaller fragment of the machine being shown in Fig. 11 than in Fig. 10; Fig. 12 is a section taken on a line corresponding to line 12—12 of either Fig. 10 or Fig. 11, showing the tie completed as in Fig. 11; and Fig. 13 is a diagram of the control system for the motor which drives the machine for making the helical ties.

In the drawings, the various mechanisms, excepting only the machine for making the helical tie, are all mounted on a long narrow frame structure composed of four legs 1 connected together by longitudinal structural metal beams 2 positioned at some distance below the upper ends of the legs, and by short transverse structural metal beams 3, at what may be termed the front and rear ends of the framework; the members 3 being arranged at the upper ends of the legs.

Supported directly from this stationary framework are the means for clamping the lower ends of two adjacent rows of vertical coil springs and guiding the tie wire thereto. The combined clamps and guides, to which I shall refer as dies, are mounted directly upon heavy longitudinal slab-like metal beams 4 and 5 which are supported at their ends by thick bars or beams 6 overlying and fixed to the end frame members 3. As best shown in Figs. 5 and 6, the members 6 have in their inner sides grooves 7 into which the ends of the beams 4 and 5 fit; the fit between the beam 5 and the members 6 being a sliding one so that this beam may be moved laterally from and toward the beam 4. One member of each pair of dies is mounted on the member 4 while the other die member is mounted on the member 5. As best shown in Figs. 8 and 12, each of the members 4 and 5 has on the upper side thereof a dove tail key 8 extending lengthwise thereof. The die blocks are engaged with and slidable along these keys. One set or row of die blocks is indicated at 9 and the other set at 10; each of the die blocks 9 being directly opposite and cooperating with the corresponding die block 10. The die blocks are fixed against displacement along the keys by means of set screws 12 or other suitable devices. By loosening these screws, the blocks may be shifted lengthwise of the machine and the spacing between consecutive pairs be varied.

Each pair of die blocks has therein one-half of a specially shaped passage or opening into which, when the blocks are spread apart, may be set short overlapping sections of the lowermost coils of a pair of vertical springs. Then, when the dies are closed, the two springs associated with each pair are firmly held in position, but in such a manner that the helical tie wire may be effectively engaged with the overlapped wires in the dies, as will hereinafter be explained.

In order to open the dies it is sufficient that one of the supports be made movable, the other remaining stationary. In the arrangement shown, the supporting member 4 is fixed to the end pieces 6 by means of suitable screws 13 while the member 5 is left free to slide in the grooves 7 in these end pieces. The member 5 may be moved from and toward the member 4 in any suitable manner. In the arrangement shown, there lies underneath the member 5 a longitudinal shaft 14 mounted in suitable bearings 15 fixed upon the longitudinal stationary frame members 2. On this shaft are several eccentrics 16. These eccentrics fit between vertical arms of brackets 17 fixed to the under side of the supporting member 5 and projecting downwardly therefrom; there being a pair of such arms in the plane of each eccentric, and the arms of each pair being on opposite sides of the eccentric shaft. On one end of the eccentric shaft, preferably the front end, is a handle or lever 18 by means of which the shaft may be turned. Obviously, when the handle is swung in one direction, the dies are opened and, when it is swung in the opposite direction, the dies are closed.

As heretofore stated, the dies have peculiarly shaped working faces. The requirements are: When the dies are closed, there must be a central longitudinal passage large enough to house two wires forming parts of two adjacent springs and, surrounding these wires, there must be a helical passage or screw thread through which the helical tie member may be screwed so as to cause it to embrace or enclose the two wires that are clamped in the dies. Furthermore, it is desirable that the inlet end to the bore through the dies be in the form of a flaring mouth which will cause the oncoming end of a tie member to be properly centered; and, in addition, the disposition of the thread should be such that the extreme end of the wire forming the tie will always enter below and then travel up on the inner side of the same coil of the springs being held in the dies. One way of describing what may be termed generally the passage through a pair of the dies is that the dies are so shaped as to provide between the same a cylindrical bore 19 of the same diameter as the diameter of the helical tie wire indicated at A, there being within this bore or passage a helical partition 20 through which is cut a more or less oval passage 21 at the axis of the main bore; the long diameter of the oval passage being vertical. Or, viewing the construction in another way, each pair of dies may be said to have through it a cylindrical bore 19 containing a screw thread, the edge faces of which, along the plane of separation between the two dies, are shaped to leave room for a section of wire from each of two springs. The inlet end of the bore 19 is made flaring, as indicated at 23.

It will be seen that, when the dies are open, as indicated in Fig. 8, a vertical coil spring, such as indicated at B, may be set down in registration with each of the die blocks, with a fragment of the lowermost coil of each spring extending down into the space between each two corresponding blocks; such being the condition illustrated in Fig. 8. If now the supporting member 5 is moved toward the member 4, causing the dies to be closed, those portions of the wires of the springs that lie between the dies of each pair will be gripped, as shown in Figs. 10 and 12. Assuming that the helical tie member is now fed forward and turned about its long axis, it will be seen that, when the advance end of the tie reaches the flaring mouth 23 of the first pair of dies within its path, it will be guided into the bore proper of these dies and will, in effect, be screwed through the dies in the manner that a bolt is screwed into a nut. The advancing end of the tie member hugs the cylindrical wall of the main bore 19 and therefore travels entirely around the two spring wires that are held clamped in the dies, until the condition illustrated in Fig. 11 is reached. After the tie member has passed through the first set of dies in the machine it is accurately directed or aimed by the latter toward the mouth of the bore or passage in the next pair of dies. It makes very little difference what happens to the tie in front of the first pair of dies, after the tie has once been screwed through those dies, because the dies now firmly hold and accurately center the tie as the advance end of the latter proceeds toward the next dies. In other words, each pair of dies serves to steady and center the advancing end of the helical tie so that it will properly enter the next pair of dies in the series.

After the tie member has been screwed through the entire series of ties so as to secure together all of the springs in the double row, the dies are opened and the springs are lifted out and moved laterally a distance equal to the diameter of one of the springs. In other words, assuming that the springs in Fig. 8 have been tied together and that the dies are open as shown, the double row of springs will be shifted so as to bring the springs, which are now shown as registering with the die blocks 10, into registration with the die blocks 9 so as to form one row of a second double row of springs to be joined together. It will be evident that what may be termed a spring fabric of any desired length may be created by simply adding row after row of springs, shifting the structure already completed after each operation of tying thereto another single row of springs.

It will be seen from Figs. 10 to 12 that the wires of the springs are straightened more or less while held clamped in the dies. However, the wires are not stressed sufficiently to give them any permanent set and, consequently, when the springs are removed from the dies, after having been tied together, the straightened wire sections will resume their normal curved shapes, as indicated in Fig. 9.

Since the tie wire, after it has been entered in the first die, will be automatically delivered into the other dies as long as the tie is properly advanced and turned, it is evident that the ties may be delivered directly to the machine from the tie-forming machine, without requiring any intermediate handling; the rate of advancement and the turning motion of the tie as it leaves the forming machine being obviously the proper ones to carry the tie successfully through the assembling machine. I have therefore placed in front of my improved assembling machine any usual or suitable machine C adapted to transform a straight wire into a helix of the proper diameter. After leaving the forming machine, the helical member enters the flared end 24 of a tubular guide 25 positioned in front of and in alignment with the row of dies into which the tie member is to be fed. After a proper length of the tie member has been fed into the assembling machine, the tie-forming machine is stopped and the tie member is severed at a point between the tubular guide 25 and the first pair of dies; thus leaving the unused part of the tie member in position to be advanced into the dies, upon starting the tie-forming machine, when the work in the assembling machine has been made ready for another tying operation.

I have also made provision for tying the springs together at the top as well as at the bottom. For this purpose I employ substantially the same means as that heretofore described, excepting that it is so mounted and supported as to overlie the springs. This upper mechanism is supported from the legs of the stationary framework upon the upper ends of four screw posts 26. Each post is screw-threaded through a bearing block 27 fixed to one of the legs by a suitable bracket 28. As best shown in Fig. 3, each of the posts 26 has an upper portion 29 of reduced diameter so as to form at some distance below the upper end an upwardly-facing annular shoulder 30. Suitable bearing boxes 32 surround the parts 29 of the posts and rest upon the shoulders 30. The bearing boxes at the rear end of the machine are connected together by a transverse structural metal beam 33, whereas there is a similar cross piece 34 between the two front bearing boxes 32. On top of and fixed to the members 33 and 34 are beams or rails 35 similar to the beams or rails 6. Supported by the members 35, are long heavy longitudinal members 36 and 37 corresponding to the members 4 and 5, respectively; the member 37 being slidable from and toward the member 36. The members 36 and 37 carry on their under sides die blocks 38 and 39, corresponding to the die blocks 9 and 10, respectively. Above the supporting member 37 is a longitudinal shaft 40, corresponding to the shaft 14 and having thereon several eccentrics 42 which operate between the vertical arms of pairs of brackets 43 fixed to and rising from the member 37. The shaft 40 is mounted in suitable bearing blocks 44 depending from a longitudinal heavy supporting plate 45 which, as best shown in Figs. 1 and 2, is carried at its ends upon brackets 46 fixed to and rising from the cross pieces 35. The shaft 40 has at its front end a handle 47 by means of which the shaft may be turned in either direction to open and close the dies at will.

The four screw posts are all connected by an endless sprocket chain 48 passing around sprocket wheels 49 on the upper ends of the posts. One of the posts is adapted to be rotated by an electric motor 50. By reason of the sprocket chain connections between the posts, the turning of one of the posts causes the others to rotate in the same direction and at the same speed. In order to support the long longitudinal runs of the sprocket chains and keep them from sagging, I connect corresponding ends of the front and rear cross members 33 and 34 by means of light rails 51 the main portions of which lie just below the plane of the sprocket wheels and thus permit the sprocket chains to rest upon the same without sagging. The motor is of the reversible type so that by energizing it, it may cause the four posts to be screwed downwardly through the bearings 27 or to be raised. The parts are so proportioned that the upper die mechanism may be raised high enough to permit springs to be set into the machine, as shown in Fig. 2, without coming in contact with the upper dies; or, in preparing the work to receive an upper tie, the superstructure may be lowered sufficiently to compress the springs more or less and thus make it easy to snap the loose upper ends of the springs into proper positions with respect to the upper dies.

It is believed unnecessary to describe in detail the manner of applying a tie along the tops of the springs, since the mechanism provided for this purpose, and the operation thereof, are precisely the same as that heretofore described. There is only one additional feature required in order properly to deliver the helical tie member to the first set of dies of the upper group, and that is provision for shifting the guide 25 from a position in alignment with the bores in the lowermost dies to one in which it is aligned with the upper dies. In the arrangement shown, the tubular guide 25 is mounted on a shoe 52 adapted to slide up and down on a stationary post 53 at the longitudinal center and near the front end of the machine. The shoe is interlocked with the post so that it is held against movements in any direction except vertically. The post 53 has in one face a pair of recesses 54, 54 spaced apart in the vertical direction, and the shoe 52 carries a spring-pressed ball 55 adapted to be seated in either recess and serve yieldingly to hold the shoe up or down, depending upon which of the recesses the ball occupies. Of course, the parts are so proportioned that, when the ball or catch is in the upper recess, the tubular guide 25 is aligned with the upper dies and, when in the lower recess, causes the tubular guide to be held in alignment with the lower dies. The shoe, with its tubular guide, may be raised and lowered in any suitable manner as, for example, by means of a pivoted lever or handle 56 within convenient reach of the operator who also manipulates the handles 18 and 47.

It is advisable that the stopping of the various mechanisms be effected automatically and thus require no attention on the part of the operator. As heretofore stated, the tie-forming machine C should be stopped whenever a tie has been fed through an entire row of dies. To this end I have placed at the rear end of the machine a pair of switch boxes 57 and 58 having vane-like handles 59 that lie in the path of travel of a lower tie member and an upper tie member, respectively. As best shown in Figs. 2 and 6, these switch boxes are supported from the die-supporting members 4 and 36, respectively. A slight pressure on either of the handles 59 will break the circuit for the motor (not shown), for the tie-forming machine C. Consequently, as the members 59 are in the paths of travel of the ties, the motor circuit will be interrupted and the feeding of the tie will cease whenever either a lower or an upper tie has been fed throughout the length of an entire row of springs. By providing a proper manually-controlled switch for again starting the motor, the operator may be permitted to push the end of the helical tie member aside and permit the automatic switch again to close, after the motor has stopped, without restarting the motor. Fig. 13 is a diagram of the circuit for the motor which drives the tie-forming machine C. Referring to this diagram, L and L' are the line wires and M is the motor. It will be seen that the circuit for the motor passes through switches 57 and 58 and through a manual switch 60. The switch 60 tends constantly to open, but may be held closed by a catch 62 drawn into holding position by an electromagnet 63, but tending constantly to assume an idle position. The circuit for the electro-magnet includes both of the switches 57 and 58. When all of the switches are closed, the motor is energized. Whenever either the switch 57 or 58 is opened, the circuits for both the motor and electro-magnet are interrupted and the switch 60 automatically opens. Thereafter, even if the switches 57 and 58 are both closed, the motor cannot start until the switch 60 is manually closed. If desired, the circuit for the electro-magnet may be provided with a manual switch 64 so that the motor may be stopped by opening that switch.

The motor 50 for raising and lowering the upper die-supporting structure is preferably stopped automatically after having been started by pressing a button or the like. A means for accomplishing this is shown in Fig. 2 wherein 65 is a switch box provided with two buttons 66 which may be similar to the interconnected buttons in an ordinary wall switch in a house lighting circuit. Cooperating with the circuits controlled by the buttons 66 is a switch-controlling arm 67 lying below and in the path of travel of a finger 68 projecting forwardly from the upper frame member 34. The finger 68 is interconnected with a second lever 69 whose free end overlies the finger 68. It will thus be seen that, when the upper dies are raised, the lever 67 is swung up in unison with the lever 69 whereas, when the upper dies are lowered, the finger 68 acts directly on the lever 67 to force it down. It will be understood that the lever 67 operates a reversing switch so that, when this lever is in one position, the motor turns in a direction to raise the upper dies and, when the lever is in the other position, the motor may be energized to turn in a direction to cause the dies to descend. The reversing switch, alone, does not complete the circuit; but it is always necessary to press the proper push button, in order again to start the motor, after the reversing switch has been shifted and the motor thereby stopped.

It will be understood that what has been illustrated and described involves the invention in a preferred and complete form, and that it is of course possible to obtain some of the advantages of the invention by using only a part of the whole. Although the operation and manner of using my improved machine or apparatus is probably evident from the foregoing detailed description of the construction, I shall make a brief explanation of the same, taking into consideration only the machine or mechanism as a whole. To begin the construction of a spring fabric, having the upper dies raised, as shown in Figs. 2 and 3, and both sets of dies open, as shown in Fig. 8, two rows of springs are set in slightly overlapping relation to each other, as shown in Fig. 8; the overlapping portions of each pair of springs lying between a pair of lower die blocks. The lower dies are then closed so as to clamp the corresponding springs of the two rows together. Then the "down" button of the pair of switch buttons 66 is pressed, causing the upper die mechanism to be lowered into the position shown in Figs. 3 and 5, thereby compressing the springs. If the upper ends of the springs are not now properly located with respect to the upper dies, the operator can quickly manipulate any of the springs that are out of place and cause them to snap into position. The upper dies are then closed by means of the handle 47 and the work is now ready to receive the tie members. Assuming that the guide 25 for the tie member is in its lower position and that the advance end of the tie emerging from the machine C extends through this guide, the pressing of the push button 60 sets the tie-forming machine into operation and causes the tie to be screwed through one after the other of the lower set of dies. After the advance end of the tie emerges from the last pair of dies of the series it strikes the switch arm 59 of the switch 57, thereby opening the circuit for the motor of the die-forming machine and stopping the feeding of the tie wire. The opening of the switch 57 automatically causes the manual push button switch 60 to open, so that the motor for the tie-forming machine will not again start until the push button 60 is again pressed in. The operator severs the helical tie at a point between the tubular guide 25 and the first pair of dies. The tubular guide is then moved up into the position shown in dotted lines in Fig. 5, aligning the advance end of the helical tie with the openings in the upper row of dies. The tie-forming machine is then started, causing the tie to be fed throughout the length of the machine, as before, but passing through the upper row of dies and securing together the uppermost coils of the springs. When the advance end of the tie reaches the rear end of the machine, it causes the switch 58 to open and, as before, the manual switch 60 also opens. The operator now presses the "up" button of the pair of buttons 66, causing the upper structure carrying the upper row of dies to be returned to the raised position illustrated in Figs. 2 and 3. The two united rows of springs are now lifted up clear of the lower dies and moved upwardly, as viewed in Fig. 8, until the row of springs that is the lower row in Fig. 8 registers with the die blocks 9. A third row of springs is then placed in proper relation to the die blocks 10 and the cycle of operations that have heretofore been described is repeated, bringing the spring structure or fabric to the point where it contains three connected rows of springs. Obviously, the process may be repeated indefinitely until the spring structure contains any desired number of rows.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a machine of the character described, a pair of dies having meeting faces forming between them a cylindrical passage adapted to receive and hold side by side wire elements of two coil springs, said passage being screw-threaded to permit a helical tie member to be screwed into the same and surround said wires.

2. In a machine of the character described, a plurality of pairs of dies spaced apart from each other and having aligned cylindrical passages therethrough, the dies of each pair being separable along the length of said passages to permit wire elements of two coiled springs to be inserted between the dies of each pair, when open, and be held by the dies, when closed; said passages being screw-threaded to permit a long helical tie member of approximately the same diameter as the passages to be screwed through all of the pairs of dies and embrace both wires in each pair.

3. In a machine of the character described, a plurality of pairs of dies spaced apart from each other and having aligned cylindrical passages therethrough, the dies of each pair being separable along the length of said passages to permit wire elements of two coiled springs to be inserted between the dies of each pair, when open, and be held by the dies, when closed; said passages being screw-threaded to permit a long helical tie member to be screwed through all of the pairs of dies and embrace both wires in each pair; and means to screw a helical tie member through said dies.

4. In a machine of the character described, two sets of dies arranged in two parallel rows one above the other, each set comprising a plurality of pairs of dies having aligned passages therethrough, the dies of each pair being separable along the length of the passage therein to receive between them wire elements of two springs to be tied together, the passages in the dies being screw-threaded to permit a long helical tie to be screwed through the passages in each row, means to fashion a wire into a long helical member and advance the helical member progressively, and means to guide the advance end of the said helical member into the passage in the first pair of dies of either row.

5. In a machine of the character described, two sets of dies arranged in two parallel rows one above the other, each set comprising a plurality of pairs of dies having aligned passages therethrough, the dies of each pair being separable along the length of the passage therein to receive between them wire elements of two springs to be tied together, the passages in the dies being screw-threaded to permit a long helical tie to be screwed through the passages in each row, and means to support the dies so as to permit the distance between the two rows to be varied.

6. In a machine of the character described, two sets of dies arranged in two parallel rows one above the other, each set comprising a plurality of pairs of dies having aligned passages therethrough, the dies of each pair being separable along the length of the passage therein to receive between them wire elements of two springs to be tied together, the passages in the dies being screw-threaded to permit a long helical tie to be screwed through the passages in each row, means to support the dies so as to permit the distance between the two rows to be varied; means to fashion a wire into a long helical member and advance the helical member progressively, and means to guide the advance end of the said helical member into the passage in the first pair of dies of either row regardless of the distance between the rows.

7. In a machine of the character described, a pair of dies having between them a passage adapted to receive and hold side by side wire elements of two coil springs, said passage being screw-threaded to permit a helical tie member to be screwed into the same and surround said wires, mechanism for fashioning a wire into a long helical member and feeding the latter into said dies; and means automatically to stop said mechanism after a predetermined length of such helical member has been fed.

8. In a machine of the character described, two sets of dies arranged in two parallel rows one above the other, each set comprising a plurality of pairs of dies having aligned passages therethrough, the dies of each pair being separable along the length of the passage therein to receive between them wire elements of two springs to be tied together, the passages in the dies being screw-threaded to permit a long helical tie to be screwed through the passages in each row, means to fashion a wire into a long helical member and advance the helical member progressively, a device to guide the advance end of the said helical member, and means to hold said device in front of the first pair of dies of either row.

9. In a machine of the character described, two sets of dies arranged in two parallel rows one above the other, each set comprising a plurality of pairs of dies having aligned passages therethrough, the dies of each pair being separable along the length of the passage therein to receive between them wire elements of two springs to be tied together, the passages in the dies being screw-threaded to permit a long helical tie to be screwed through the passages in each row, a stationary support for the dies of the lower row, a vertically-adjustable support for the dies of the upper row, and means to raise and lower the latter support so as to cause the distance between the two rows to be varied.

10. In a machine of the character described, two sets of dies arranged in two parallel rows one above the other, each set comprising a plurality of pairs of dies having aligned passages therethrough, the dies of each pair being separable along the length of the passage therein to receive between them wire elements of two springs to be tied together, the passages in the dies being screw-threaded to permit a long helical tie to be screwed through the passages in each row, means to support the dies so as to permit the distance between the two rows to be varied, mechanism to fashion a wire into a long helical member and advance the helical member progressively, means to guide the advance end of the said helical member into the passage in the first pair of dies of either row regardless of the distance between the rows, and means automatically to stop said mechanism whenever said helical member has been fed through all of the pairs of dies of either row.

JOSEPH W. BOWERSOX.